US012174560B2

(12) United States Patent
Minoshima et al.

(10) Patent No.: US 12,174,560 B2
(45) Date of Patent: Dec. 24, 2024

(54) TONER CARTRIDGE AND DRUM CARTRIDGE

(71) Applicant: BROTHER KOGYO KABUSHIKI KAISHA, Nagoya (JP)

(72) Inventors: Saya Minoshima, Gifu (JP); Tomitake Aratachi, Toyokawa (JP); Keita Shimizu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/471,432

(22) Filed: Sep. 21, 2023

(65) Prior Publication Data

US 2024/0012345 A1 Jan. 11, 2024

Related U.S. Application Data

(63) Continuation of application No. PCT/JP2022/016981, filed on Apr. 1, 2022.

(30) Foreign Application Priority Data

Apr. 1, 2021 (JP) ................................ 2021-062542

(51) Int. Cl.
*G03G 15/08* (2006.01)

(52) U.S. Cl.
CPC ..... *G03G 15/0886* (2013.01); *G03G 15/0863* (2013.01); *G03G 15/0891* (2013.01)

(58) Field of Classification Search
CPC ........... G03G 15/0863; G03G 15/0886; G03G 15/0891

(Continued)

(56) References Cited

U.S. PATENT DOCUMENTS

2011/0129252 A1 6/2011 Oda et al.
2017/0185032 A1 6/2017 Itabashi et al.

(Continued)

FOREIGN PATENT DOCUMENTS

CA 2910823 * 7/2013
JP 2012-234190 A 11/2012

(Continued)

OTHER PUBLICATIONS

International Search Report issued in related PCT/JP2022/016981, Jun. 21, 2022.

(Continued)

*Primary Examiner* — Hoan H Tran
(74) *Attorney, Agent, or Firm* — Merchant & Gould P.C.

(57) ABSTRACT

A toner cartridge includes a toner housing, a toner conveyor unit, a first cover, a shutter, a toner memory, and a memory holder. The first cover covers a toner housing opening and is movable together with the toner housing. The shutter includes a protrusion. The memory holder holds the toner memory and is movable relative to the toner housing. When the toner cartridge is attached, the protrusion is located in place, and the toner housing is movable between a close position in which the shutter closes a cover opening of the first cover and an open position in which at least part of a shutter opening of the shutter is aligned with at least part of the cover opening to allow toner to be let out through the cover opening. The position of the memory holder is different from the position of the shutter in a first direction.

11 Claims, 12 Drawing Sheets

(58) Field of Classification Search
USPC .................................................. 399/258–263
See application file for complete search history.

(56) References Cited

U.S. PATENT DOCUMENTS

| | | | |
|---|---|---|---|
| 2017/0285529 | A1 | 10/2017 | Nishiyama |
| 2017/0285530 | A1 | 10/2017 | Nishiyama et al. |
| 2019/0064700 | A1 | 2/2019 | Nishiyama |
| 2019/0265641 | A1 | 8/2019 | Yokoi |

FOREIGN PATENT DOCUMENTS

| | | | |
|---|---|---|---|
| JP | 2017-116828 | A | 6/2017 |
| JP | 2017-182008 | A | 10/2017 |
| JP | 2017-182009 | A | 10/2017 |
| JP | 2019-191476 | A | 10/2019 |
| JP | 2021056428 | * | 4/2021 |

OTHER PUBLICATIONS

International Preliminary Report on Patentability issued in related application PCT/JP2022/016981, Oct. 3, 2023.

* cited by examiner

TONER CARTRIDGE AND DRUM CARTRIDGE

REFERENCE TO RELATED APPLICATIONS

This application is a continuation application of International Application No. PCT/JP2022/016981 filed on Apr. 1, 2022 which claims priority from Japanese Patent Application No. 2021-062542 filed on Apr. 1, 2021. The disclosures of these applications are incorporated herein by reference in their entirety.

BACKGROUND ART

A toner cartridge to be attached to a development device in an image forming apparatus may be provided with a shutter which can be opened and closed in conjunction with operations for attaching and detaching the toner cartridge to and from the development device. For example, JP 6206530 B2 discloses a toner cartridge comprising a toner housing and a shutter, such that in the process of attachment of the toner cartridge, the toner housing is caused to make a rotation which in turn causes the shutter to be opened.

A toner cartridge including a toner memory for storing information about the toner cartridge is also known in the art.

DESCRIPTION

Assuming that the toner cartridge as disclosed in JP 6206530 B2 includes a toner memory, it is preferable that the toner memory be provided in such a manner that the toner memory is out of the way of the toner housing being rotated in the process of attachment of the toner cartridge.

It would thus be desirable to provide a toner cartridge in which a shutter can be opened and closed in conjunction with operations for attaching and detaching the toner cartridge to and from a development device, with a toner memory which is out of the way of the toner housing being rotated in the process of attachment of the toner cartridge. Alternatively, a toner cartridge comprising a toner memory may preferably be configured such that an electric contact surface of the toner memory can be restrained from rubbing against a counterpart electric contact in the housing of an image forming apparatus, in the process of attachment of the toner cartridge into the image forming apparatus.

More specifically, a toner cartridge in one aspect is disclosed herein which comprises a toner housing, a toner conveyor unit, a first cover, a shutter, a toner memory, and a memory holder. The toner housing extends in a first direction. The toner housing has a first interior space to store toner therein. The toner housing includes one end portion in the first direction. The toner housing has a toner housing opening at the one end portion. The toner housing opening allows the toner in the first interior space to be let out from the toner housing. The toner conveyor unit extends in the first direction. The toner conveyor unit is rotatable about a first axis extending in the first direction. The toner conveyor unit is configured to convey toner from the first interior space to the toner housing opening. The first cover is located at the one end portion of the toner housing. The first cover covers the toner housing opening. The first cover is movable together with the toner housing. The first cover has a cover opening allowing the toner in the first interior space to be let out from the toner housing. The shutter is located at the one end portion of the toner housing. The shutter has a shutter opening. The shutter includes a protrusion protruding in the first direction. The protrusion is positioned farther, than the first cover, from the one end portion of the toner housing in the first direction. The toner memory has an electric contact surface extending in a second direction crossing the first direction. The electric contact surface crosses a third direction. The third direction is a direction crossing the first direction and the second direction. The memory holder has an outer surface to hold the toner memory. The memory holder is movable relative to the toner housing. The memory holder is movable in the third direction. When the toner cartridge is attached to a development device, the protrusion is located in place relative to the development device, and the toner housing is movable together with the first cover relative to the development device between a close position and an open position. When the toner housing is in the close position, the cover opening is closed with the shutter. When the toner housing is in the open position, at least part of the shutter opening is aligned with at least part of the cover opening to allow the toner to be let out through the cover opening. A position of the memory holder is different from a position of the shutter in the first direction.

With this configuration, in which the memory holder is located at a position different from a position of the shutter in the first direction, the toner memory is out of the way and thus will not become an encumbrance as the toner housing is rotated in the process of attachment to the toner cartridge. Further, as the memory holder for holding the toner memory is configured to be movable in the third direction relative to the toner housing, the electric contact surface of the toner memory can be restrained from rubbing against a counterpart electric contact in a housing of an image forming apparatus, in the process of attachment of the toner cartridge into the image forming apparatus. With the memory holder located at a position different from the position of the shutter in the first direction, undesirable upsizing of the toner cartridge in the second direction can be restrained.

In the toner cartridge as described above, the protrusion may be located at a position between the cover opening and the memory holder in the first direction.

In the toner cartridge as described above, additionally or alternatively, the memory holder and the toner housing may be aligned in the first direction.

With this feature, the toner cartridge can be restrained from upsizing in the second direction.

In the above-described toner cartridge, the electric contact surface may be located at a position different from a position of the toner housing in the first direction.

In the above-described toner cartridge, the electric contact surface may be arranged to face in a direction perpendicular to the first direction.

The above-described toner cartridge may be configured such that the toner cartridge includes a first guide that guides the memory holder in a manner that permits the memory holder to move relative to the toner housing, wherein the first guide has a first slot elongate in the third direction, and a second slot elongate in the third direction, the second slot being positioned at a predetermined distance apart from the first slot in the third direction, and wherein the memory holder includes a first boss protruding from the memory holder in the first direction and located in the first slot, and a second boss protruding from the memory holder in the first direction and located in the second slot, the second boss being positioned at a predetermined distance apart from the first boss in the third direction.

The toner cartridge with a first guide described above may be configured such that the first slot includes a first end portion, and a second end portion located apart, in the third direction, from the first end portion, the second end portion of the first slot having a dimension greater than a dimension of the first end portion of the first slot in the second direction, wherein the second slot includes a first end portion, and a second end portion located apart, in the third direction, from the first end portion, the second end portion of the second slot having a dimension greater than a dimension of the first end portion of the second slot in the second direction, and wherein, in a case where the first boss is positioned at the second end portion of the first slot and the second boss is positioned in the second end portion of the second slot, the memory holder is movable in the second direction.

The above-described toner cartridge may further comprise an engageable portion that is locked by a lock lever of the development device, in a case where the toner cartridge is attached to the development device, wherein the engageable portion is located at another end portion of the toner housing being positioned at an opposite side of the one end portion.

In another aspect, a drum cartridge disclosed herein comprises a photoconductor drum, a first frame supporting the photoconductor drum, a development device including a development roller, and the above-described toner cartridge.

The drum cartridge as described above may be additionally configured such that the toner housing has a first side surface facing in the first direction, the first side surface being located at the one end portion of the toner housing, wherein the first frame includes a first side wall facing to the first side surface of the toner housing, and wherein the first side wall is located between at least part of the memory holder and the toner housing in the first direction.

The drum cartridge with or without additional features as described above may further comprise a detection gear for detecting whether or not the drum cartridge is brand-new, and at least part of the memory holder may be located within an area corresponding to an extent of the detection gear in the first direction.

The above aspects, other advantages and further features will become more apparent by describing in detail illustrative, non-limiting embodiments thereof with reference to the accompanying drawings, in which.

Figure 1:
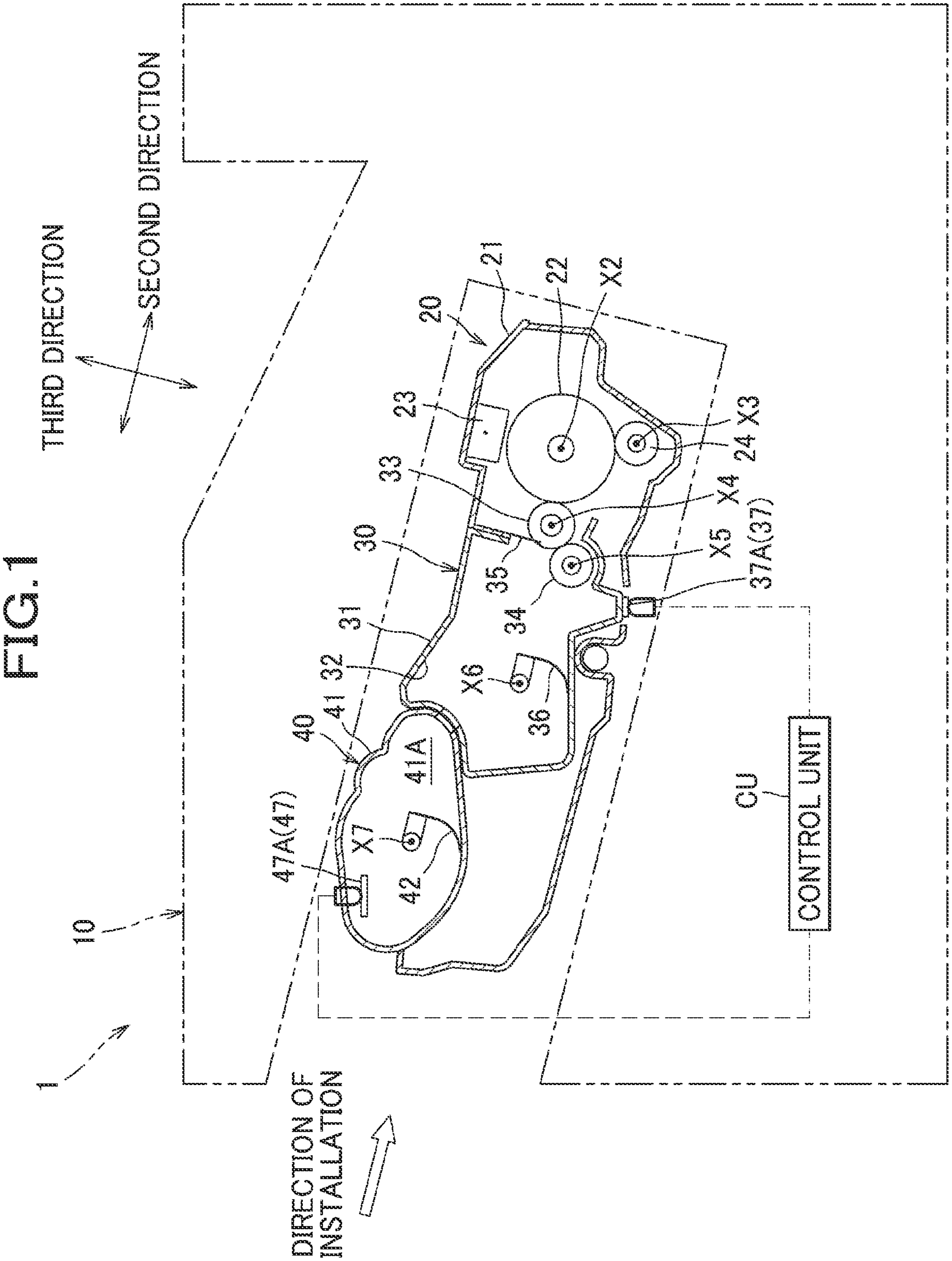
FIG. 1 is a section view showing a drum cartridge according to an illustrative, non-limiting embodiment.

A detailed description will be given of an illustrative, non-limiting embodiment with reference made to the drawings where appropriate. As shown in FIG. 1, an image forming apparatus 1 includes a main body housing 10, a drum cartridge 20, and a control unit CU.

The image forming apparatus 1 in this embodiment is a monochrome printer. The drum cartridge 20 is used in the image forming apparatus 1. The drum cartridge 20 is installable into and removable from the main body housing 10. The drum cartridge 20 is attached in a direction of installation shown in FIG. 1. The control unit CU includes a central processing unit (CPU) and other components to execute printing control. When the drum cartridge 20 is attached in the main body housing 10, the control unit CU is capable of communicating with a drum memory 37 and a toner memory 47 which will be described below.

Figure 2:
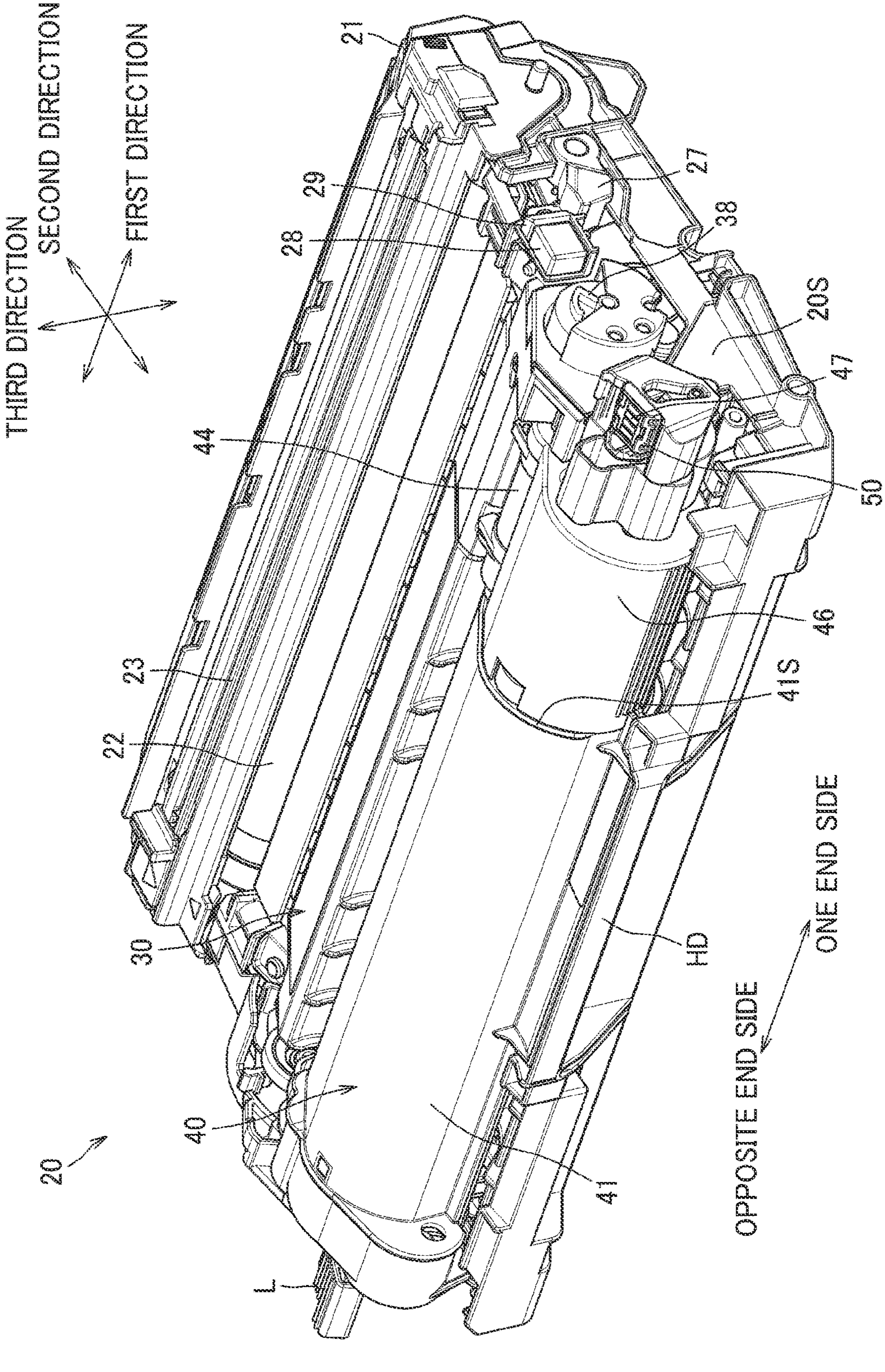
FIG. 2 is a perspective view of the drum cartridge.

As shown in FIGS. 1 and 2, the drum cartridge 20 includes a first frame 21, a photoconductor drum 22, a charger 23, a transfer roller 24, a development device 30, a toner cartridge 40, and a lock lever L.

The first frame 21 is a frame with which the drum cartridge 20 is covered in its entirety. The first frame 21 supports the photoconductor drum 22 in a manner that permits the photoconductor drum 22 to rotate. The photoconductor drum 22 is rotatable on a second axis X2 extending in a first direction.

The charger 23 is a member that charges the photoconductor drum 22. The charger 23 is a scorotron charger spaced apart from the photoconductor drum 22.

The transfer roller 24 is a roller for transferring toner carried on the photoconductor drum 22 onto a sheet (not shown). The transfer roller 24 is rotatable on a third axis X3 extending in the first direction. The transfer roller 24 is in contact with the photoconductor drum 22.

The development device 30 includes a second frame 31, a development housing 32, a development roller 33, a supply roller 34, a doctor blade 35, an agitator 36, a drum memory 37, and a detection gear 38.

The second frame 31 is a frame with which the development device 30 is covered in its entirety. The second frame 31 is held by the first frame 21. The second frame 31 is configured to allow the toner cartridge 40 to be attached thereto. The second frame 31 may be fixed undetachably to the first frame 21, or detachably attached to the first frame 21.

The development roller 33 is a roller that supplies toner to the photoconductor drum 22. The development roller 33 is rotatably held by the second frame 31. The development roller 33 is rotatable on a fourth axis X4 extending in the first direction. The second frame 31 includes one end portion and an opposite end portion located apart from each other in a second direction crossing the first direction, and the development roller 33 is provided at the one end portion of the second frame 31. In the present embodiment, the second direction is perpendicular to the first direction. The second direction in the present embodiment is a direction extending in the direction of installation of drum cartridge 20. In the following description, a direction crossing the first direction and to the second direction will be referred to as "third direction". In the present embodiment, the third direction is a direction perpendicular to the first direction and to the second direction.

The supply roller 34 is a roller that supplies toner held in the development housing 32 to the development roller 33. The supply roller 34 is rotatable on a fifth axis X5 extending in the first direction.

The doctor blade 35 is a member that restricts the thickness of a layer of toner on the development roller 33. The doctor blade 35 is contactable with the development roller 33.

The agitator 36 is a member that agitates toner in the development housing 32. The agitator 36 also serves to supply toner held in the development housing 32 to the supply roller 34. The agitator 36 is rotatable on a sixth axis X6 extending in the first direction.

The drum memory 37 is a storage medium for storing information. Examples of such storage medium usable for this purpose may include, but is not limited to, an IC chip. The drum memory 37 is capable of storing information about the drum cartridge 20. The information about the drum cartridge 20 may include at least one of identification information by which the drum cartridge 20 is identifiable and life expectancy information indicative of the expected service life of the drum cartridge 20. The identification information may include, for example, a serial number. The life expectancy information may include, for example, at least one of a cumulative number of rotations of the photoconductor drum 22, a cumulative number of rotations of the development roller 33, a dot count (the number of dots or pixels generated for image formation), and a remaining amount of toner.

Figure 3:
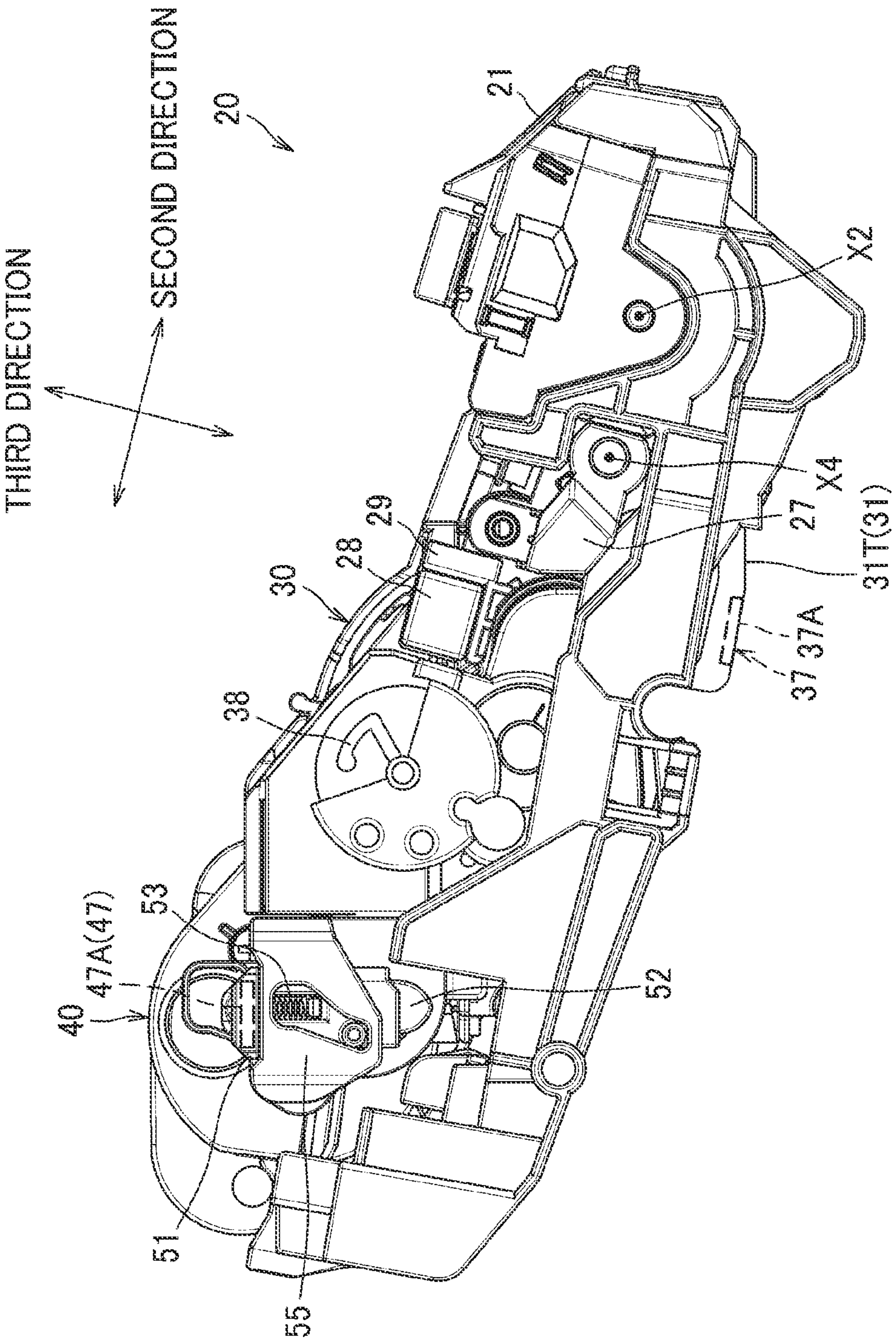
FIG. 3 is a side view of the drum cartridge.

As shown in FIG. 3, the drum memory 37 is located at the second frame 31. To be more specific, the drum memory 37 is positioned at a bottom surface 31T, that is an undersurface (on a lower side), of the second frame 31. The drum memory 37 has an electric contact surface 37A. The electric contact surface 37A of the drum memory 37 faces downward when the drum cartridge 20 is attached in the image forming apparatus 1 (see FIG. 1).

Figure 4:
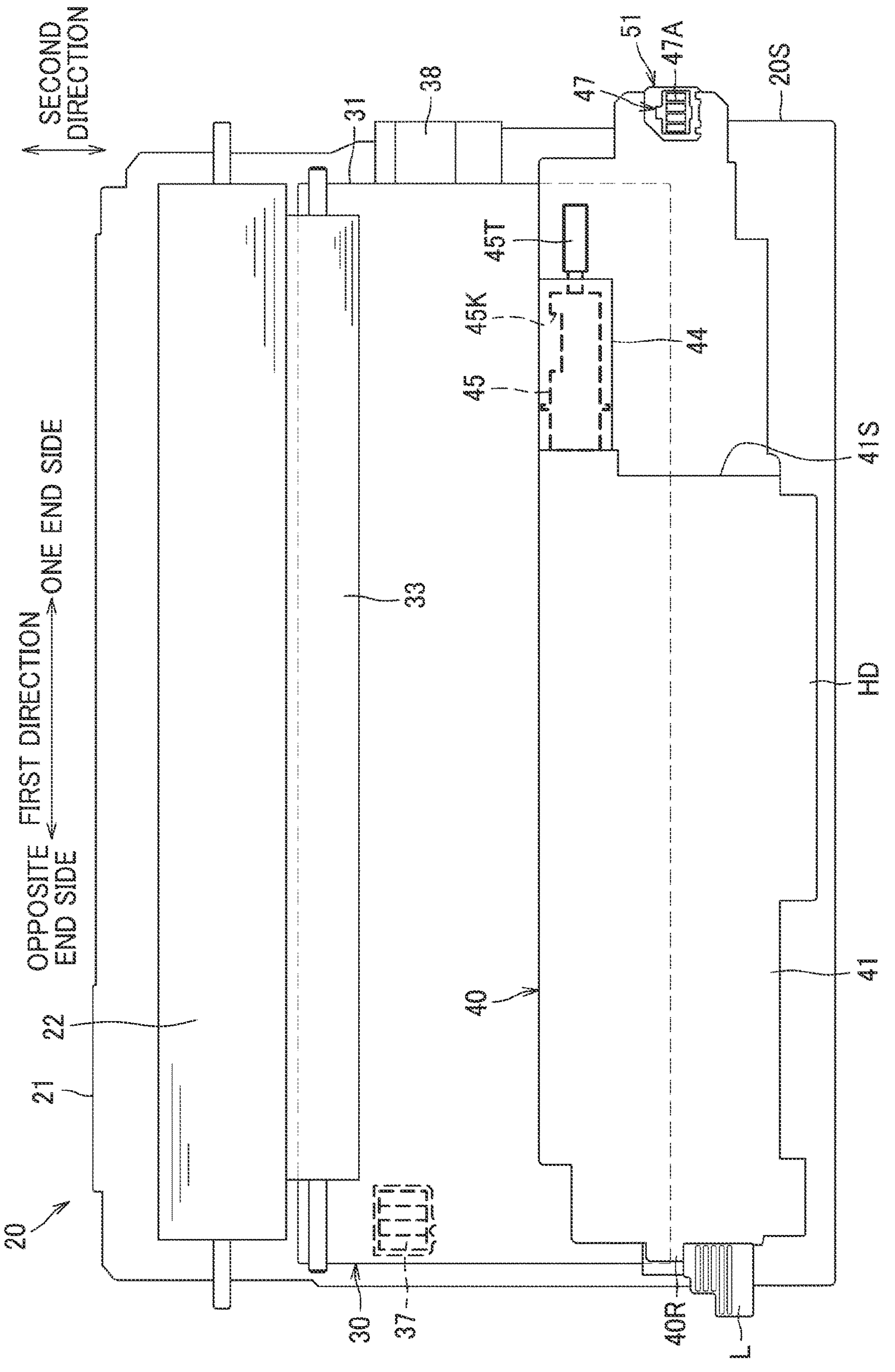
FIG. 4 is a plan view of the drum cartridge as viewed from above.

As shown in FIG. 4, the drum cartridge 20 includes one end portion located apart, in the first direction, from an opposite end portion thereof, and the drum memory 37 is positioned at the opposite end portion of the drum cartridge 20. Herein, the one end portion and the opposite end portion of the drum cartridge 20 are end portions of the drum cartridge 20 located apart from each other in the first direction. More specifically, the one end portion of the drum cartridge 20 is one of two end portions thereof which is closer to one extreme end at the right side in FIG. 4 than to an opposite extreme end at the left side in FIG. 4, whereas the opposite end portion of the drum cartridge 20 is the other of the two end portions thereof which is closer to the opposite extreme end at the left side in FIG. 4 than to the one extreme end at the right side in FIG. 4. In the following description, the one end portion closer to the one extreme end will be referred to simply as "one end portion", and the opposite end portion closer to the opposite extreme end will be referred to simply as "opposite end portion", where appropriate.

As shown in FIGS. 2 and 3, the detection gear 38 is a member configured to detect whether or not the drum cartridge is brand-new. The detection gear 38 has a known structure, and is configured to rotate with an angular displacement of a predetermined angle in a case where the drum cartridge 20 is brand-new, and not to rotate in a case where the drum cartridge 20 is not brand-new. The control unit CU is capable of making a determination as to whether or not the drum cartridge 20 is brand-new, based on detection of rotation of the detection gear 38.

As shown in FIG. 4, the detection gear 38 is positioned at the one end portion of the drum cartridge 20 located apart, in the first direction, from the opposite end portion thereof. In other words, the detection gear 38 is provided in the drum cartridge 20, at a location closer to the one extreme end than to the opposite extreme end, i.e., at the end portion (one end portion) opposite to the opposite end portion (the other end portion) at which the drum memory 37 is provided.

As shown in FIGS. 2 and 3, the drum cartridge 20 further includes a development electrode 27, a supply electrode 28, and an insulating member 29. The development electrode 27, the supply electrode 28 and the insulating member 29 are located at the one end portion of the drum cartridge 20 located apart, in the first direction, from the opposite end portion thereof. In other words, the development electrode 27, the supply electrode 28 and the insulating member 29 are provided at the end portion (one end portion) opposite to the opposite end portion (the other end portion) at which the drum memory 37 is provided.

The development electrode 27 is a member electrically connected to the development roller 33. The development electrode 27 is made of a conductive resin.

The supply electrode 28 is a member electrically connected to the supply roller 34. The supply roller 28 is made of a conductive resin.

The insulating member 29 is made of an insulating resin, or the like. The insulating member 29 is located between the development electrode 27 and the supply electrode 28.

As shown in FIG. 1, the toner cartridge 40 includes a toner housing 41 and an agitator 42. The toner housing 41 extends in the first direction (see FIG. 2). The toner housing 41 has a first interior space 41A provided to store toner therein. The agitator 42 agitates toner in the first interior space 41A. The agitator 42 is rotatable on a seventh axis X7 extending in the first direction.

As shown in FIG. 4, the lock lever L is a member that locks the toner cartridge 40 to the second frame 31 when the toner cartridge 40 is attached to the second frame 31 of the development device 30. The lock lever L is located at the opposite end portion of the drum cartridge 20, which is one of two end portions thereof located apart from each other in the first direction. In short, the lock lever L and the drum memory 37 are located at the same opposite end portion (the left side in FIG. 4). The location at which the lock lever L is provided is also defined as an end portion of the second frame 31 which is closer to one of two extreme ends thereof apart from each other in the second direction (the lower side in FIG. 4).

The toner cartridge 40 includes an engageable portion 40R. The engageable portion is a portion that is locked by the lock lever L to cause the toner cartridge 40 to be locked in position at the development device 30 when the toner cartridge 40 is attached to the second frame 31 of the development device 30. The engageable portion 40R is located at an opposite end portion of the toner housing 41, which is one of two end portions thereof, opposite to one end portion thereof; the one end portion of the toner housing 41 is the other of the two end portions, which is located apart, in the first direction, from the opposite end portion, and at which a toner memory 47 is provided. A detailed description of the toner memory 47 will be given later.

Figure 5A:
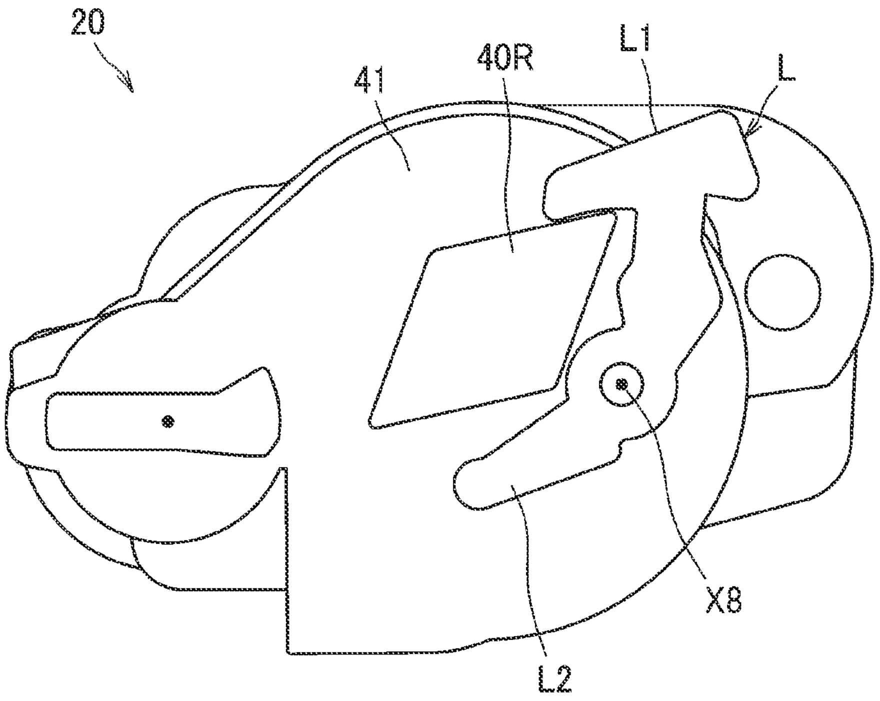
FIG. 5A is a side view of a toner cartridge, with a lock lever being in a lock position.

As shown in FIG. 5A, the lock lever L is rotatable on an eighth axis X8 extending in the first direction. The lock lever L is rotatable between a lock position shown in FIG. 5A and an unlock position shown in FIG. 5B. The lock position is a position in which the lock lever L locks the toner cartridge 40 to the second frame 31. The unlock position is a position in which the toner cartridge 40 is unlocked and released from the second frame 31. The lock lever L is biased from the unlock position toward the lock position by a biasing member (not shown).

Figure 5B:
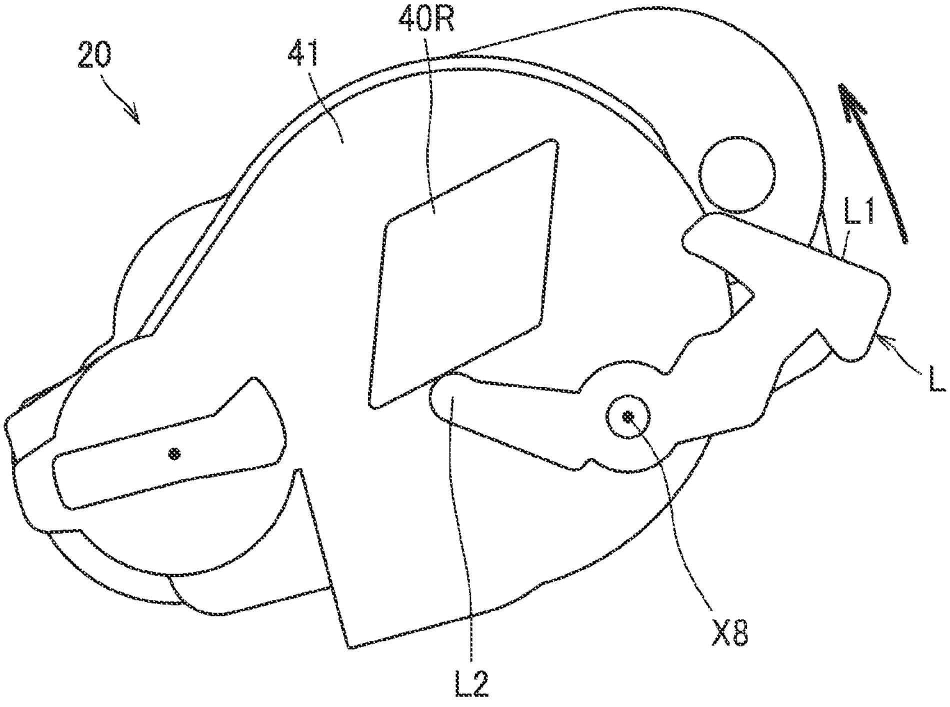
FIG. 5B is a side view of the toner cartridge, with the lock lever being in an unlock position.

The lock lever L includes an operation lug L1 used as a handle for a user to manipulate, and a push-up portion L2 providing a point of action for pushing up the toner cartridge 40. As shown in FIG. 5A, when the lock lever L is in the lock position, the operation lug L1 contacts an upper surface of the engageable portion 40R to keep the engageable portion 40R from moving upward so that the toner cartridge 40 is locked in position and fixed to the second frame 31. When a user operates the operation lug L1 and causes the operation lug L1 to move downward, the operation lug L1 comes off the upper surface of the engageable portion 40R as shown in FIG. 5B to make the engageable portion 40R movable upward, and the push-up portion L2 pushes the engageable portion 40R upward. When the push-up portion L2 pushes the engageable portion upward, the user is notified that the toner cartridge 40 can be taken out from the drum cartridge 20.

Figure 6:
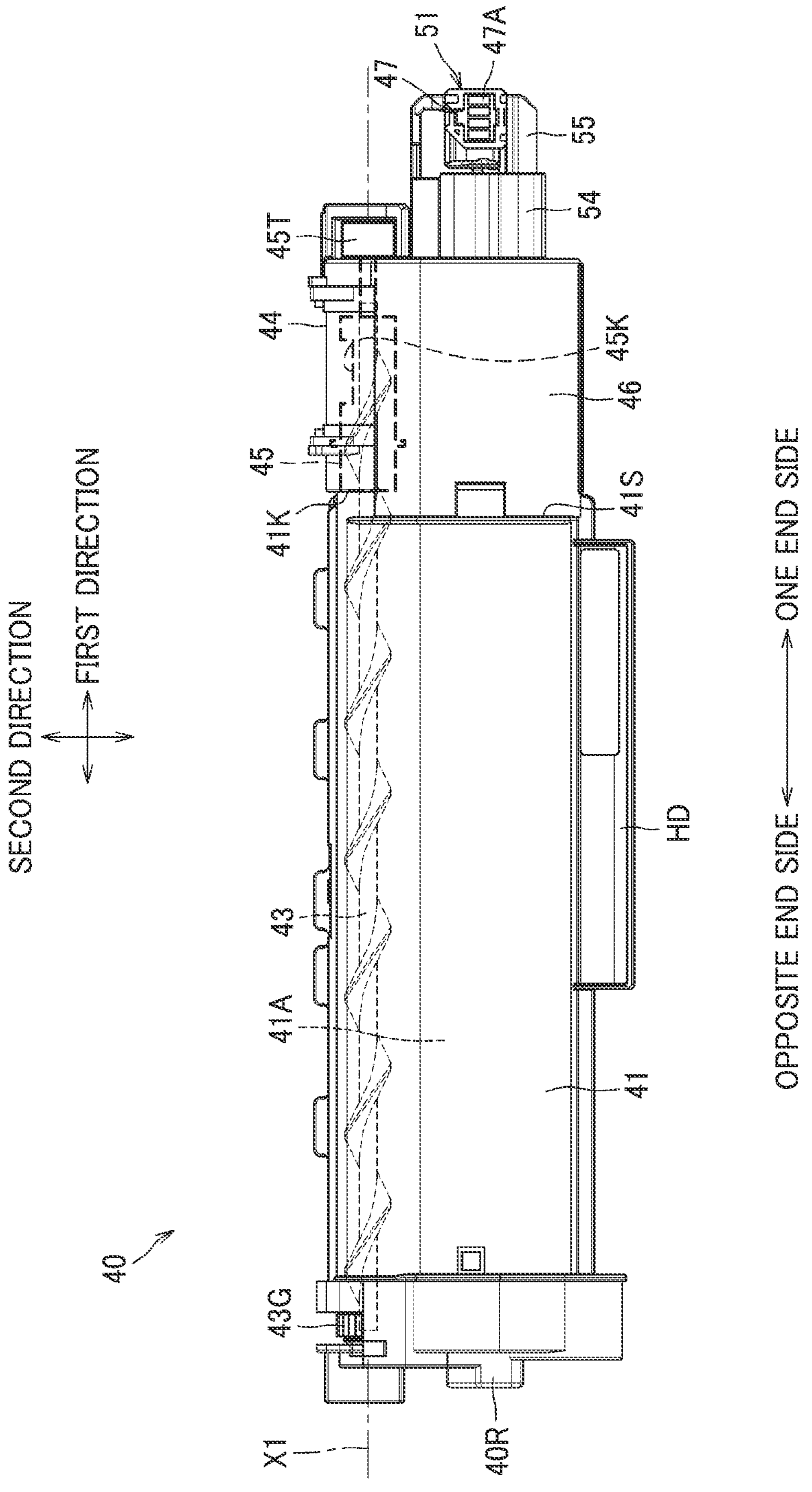
FIG. 6 is a plan view of the toner cartridge as viewed from above.
Figure 7:
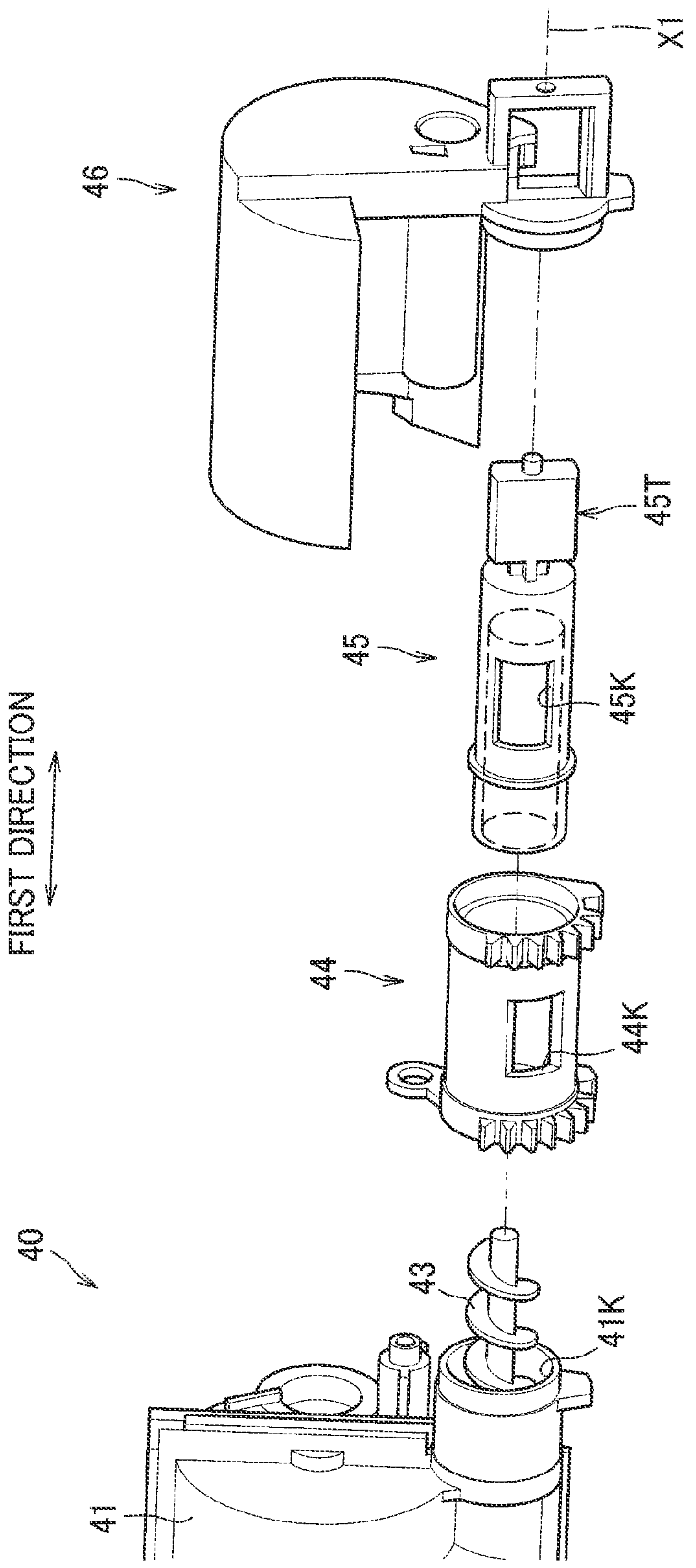
FIG. 7 is an exploded perspective view of one end portion of the toner cartridge located apart in a first direction from an opposite end portion thereof.

As shown in FIGS. 6 and 7, the toner cartridge 40 further includes a toner conveyor unit 43, a first cover 44, a shutter 45, a second cover 46, a toner memory 47, a memory holder 51, and a handle HD. The handle HD is a handgrip to be held in the hand of a user when the toner cartridge 40 is attached or detached.

As shown in FIG. 7, the toner housing 41 includes a toner housing opening 41K. The toner housing opening 41K is provided at one end portion of the toner housing 41 which is located apart, in the first direction, from an opposite end portion thereof. The toner housing opening 41K is an opening through which to allow toner in the first interior space 41A to be let out from the toner housing 41. The toner housing opening 41K is circular in shape.

The toner conveyor unit 43 extends in the first direction. The toner conveyor unit 43 is rotatable on a first axis X1 extending in the first direction. The toner conveyor unit 43 is configured to convey toner from the first interior space 41A to the toner housing opening 41K (see FIG. 6). In this embodiment, the toner conveyor unit 43 is an auger including a shaft and spirally twisted blade. The toner conveyor unit 43 includes a drive gear 43G which receives a motive power. The drive gear 43G is provided at the opposite end portion of the toner housing 41 which is located apart, in the first direction, from the one end portion thereof.

The first cover 44 is located at the one end portion of the toner housing 41 which is located apart, in the first direction, from the opposite end portion thereof. The first cover 44 has a circular cylindrical shape, and extends in the first direction. The first cover 41 is configured to cover the toner housing opening 41K. The first cover 44 is fixed to the toner housing 41, and movable together with the toner housing 41. The first cover 44 has a cover opening 44K through which to allow toner in the first interior space 41A to be let out from the toner housing 41. The cover opening 44K has a rectangular shape.

As shown in FIG. 4, the shutter 45 is located at the one end portion of the toner housing 41 which is located apart, in the first direction, from the opposite end portion thereof. When the toner cartridge 40 is attached to the second frame 31, the shutter 45 is located at a position closer to the toner memory 47 than to the drum memory 37 in the first direction. When the toner cartridge 40 is attached to the second frame 31, the shutter 45 is located between the drum memory 37 and the lock lever L in the second direction.

As shown in FIG. 7, the shutter 45 has a shape of a hollow circular cylinder, and extends in the first direction. The shutter 45 is located in the inside of the first cover 44 (see also FIG. 6). The inside of the shutter 45 receives an end portion of the toner conveyor unit 43. The shutter 45 has a shutter opening 45K. The shutter 45 includes a protrusion 45T.

The protrusion 45T protrudes in the first direction. The protrusion 45T is located, at the outside of the first cover 44, at a position farther, than the first cover 44, from the one end portion of the toner housing 41 in the first direction. The protrusion 45T is located between the cover opening 44K and the memory holder 51 in the first direction. The protrusion 45T has a shape of a flat plate. The protrusion 45T rotates together with the shutter 45.

As shown in FIG. 6, when the toner cartridge 40 is not attached to the second frame 31, the shutter opening 45K of the shutter 45 is not aligned with the cover opening 44K so as not to allow toner to be let out through the cover opening 44K. In this situation, the protrusion 45T of the shutter 45 is so positioned as to extend in the second direction.

To attach the toner cartridge 40 to the development device 30, the toner cartridge 40 is brought into contact with the second frame 31 with the toner housing 41 located in the close position, and thereafter the toner housing 41 is rotated approximately 90 degrees to the open position. The toner housing 41 rotates in conjunction with the operations for attaching the toner cartridge 40, and moves from the close position to the open position.

Figure 8A:
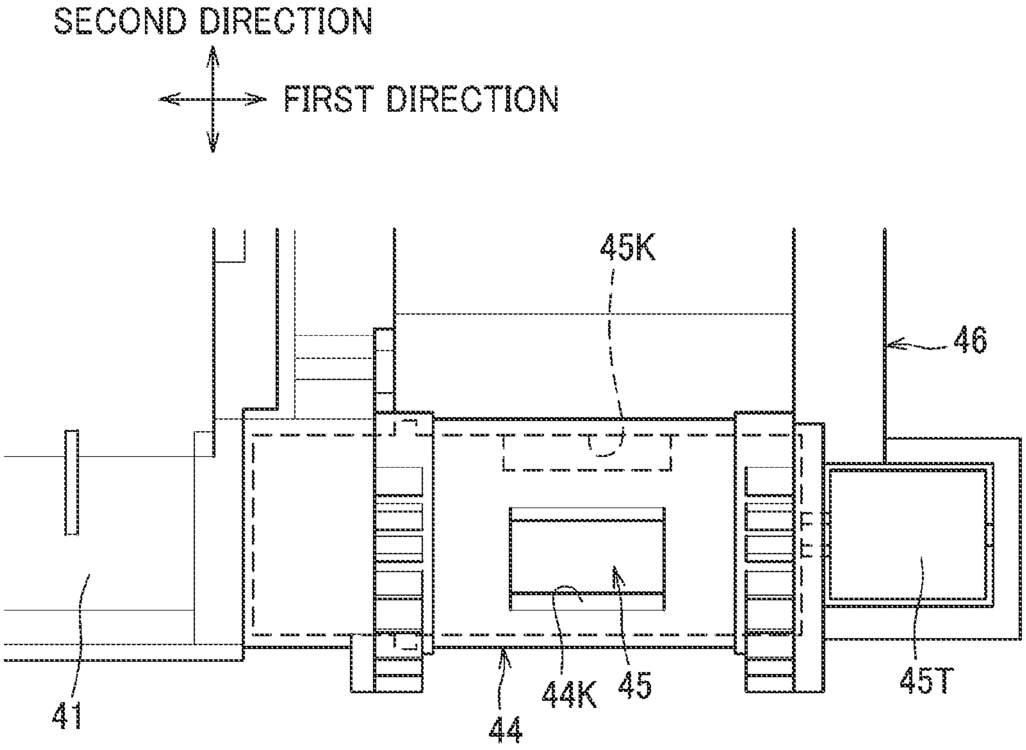
FIG. 8A shows the one end portion in which a shutter is in a close position.

As shown in FIG. 8A, when the toner housing 41 is in the close position, the shutter opening 45K is not aligned with the cover opening 44K so as not to allow the toner to be let out through the cover opening 44K. In other words, when the toner housing 41 is in the close position, the cover opening 44K is closed with the shutter 45.

Figure 8B:
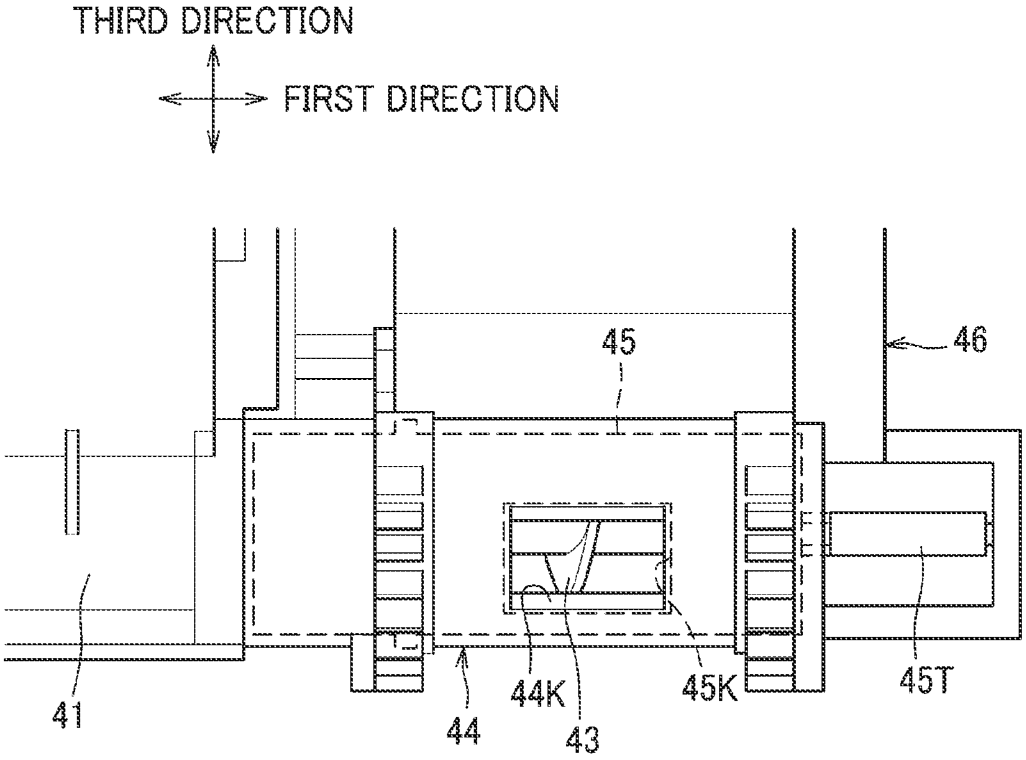
FIG. 8B shows the one end portion in which the shutter is in an open position.

As shown in FIG. 8B, when the toner housing 41 is rotated approximately 90 degrees from the close position to the open position, the shutter 45 will not rotate because the protrusion is located in place relative to the second frame 31, and the toner housing 41 and the first cover 44 rotates approximately 90 degrees. Accordingly, the shutter opening 45K rotates relative to the toner housing 41 and the first cover 44. In this manner, when the toner housing 41 is rotated from the close position to the open position, the shutter opening 45K is aligned with at least part of the cover opening 44K, so that the toner is allowed to be let out through the cover opening 44K.

The toner memory 47 is a storage medium for storing information. Examples of such storage medium usable for this purpose may include, but is not limited to, an IC chip. The toner memory 47 is capable of storing information about the toner cartridge 40. The information about the toner cartridge 40 may include at least one of identification information by which the toner cartridge 40 is identifiable and life expectancy information indicative of the expected service life of the toner cartridge 40. The identification information may include, for example, a serial number. The life expectancy information may include, for example, at least one of a cumulative number of rotations of the agitator 42 or a cumulative number of rotations of the toner conveyor unit 43, a dot count (the number of dots or pixels generated for image formation), and a remaining amount of toner.

As shown in FIG. 4, when the toner cartridge 40 is attached to the second frame 31, the toner memory 47 is located at a position closer, than the drum memory 37, to the detection gear 38 in the first direction. In other words, when the toner cartridge 40 is attached to the second frame 31, the detection gear 38 is located at a position closer, than the drum memory 37, to the toner memory 47 in the first direction.

When the toner cartridge 40 is attached to the second frame 31, the toner memory 47 is located at a position closer, than the drum memory 37, to the lock lever L in the second direction. In other words, when the toner cartridge 40 is attached to the second frame 31, the drum memory 37 is located at a position farther, than the toner memory 47, from the lock lever L in the second direction.

As shown in FIG. 6, the toner memory 47 has an electric contact surface 47A. The electric contact surface 47A is located at a position different (shifted) from a position of the toner housing 41 in the first direction. The electric contact surface 47A extends in the second direction crossing the first direction. The electric contact surface 47A is nonparallel to the third direction.

The memory holder 51 is a holder that holds the toner memory 47. The memory holder 51 holds the toner memory 47 in a manner that permits the electric contact surface 47A of the toner memory 47 to move relative to the toner housing 41.

As shown in FIG. 2, the memory holder 51 holds the toner memory 47 on an outer surface of the memory holder 51. As shown in FIG. 4, the memory holder 51 and the toner housing 41 are aligned in the first direction. At least part of the memory holder 51 is located within an area corresponding to an extent of the detection gear 38 in the first direction. The memory holder 51 is located at a position different (shifted) from a position of the shutter 45 in the first direction.

Herein, the toner housing 41 has a first side surface 41S. The first side surface 41S is located at the one end portion of the toner housing 41, located apart, in the first direction, from the opposite end portion of the toner housing 41. The first side surface 41S is a side surface facing in the first direction. The first frame 21 of the drum cartridge 20 includes a first side wall 20S facing to the first side surface 41S (see also FIG. 2). The first side wall 20S is located between at least part of the memory holder 51 and the toner housing 41 in the first direction.

The memory holder 51 is movable relative to the toner housing 41. In the present embodiment, the memory holder 51 is movable in the second direction and the third direction.

Figure 9:
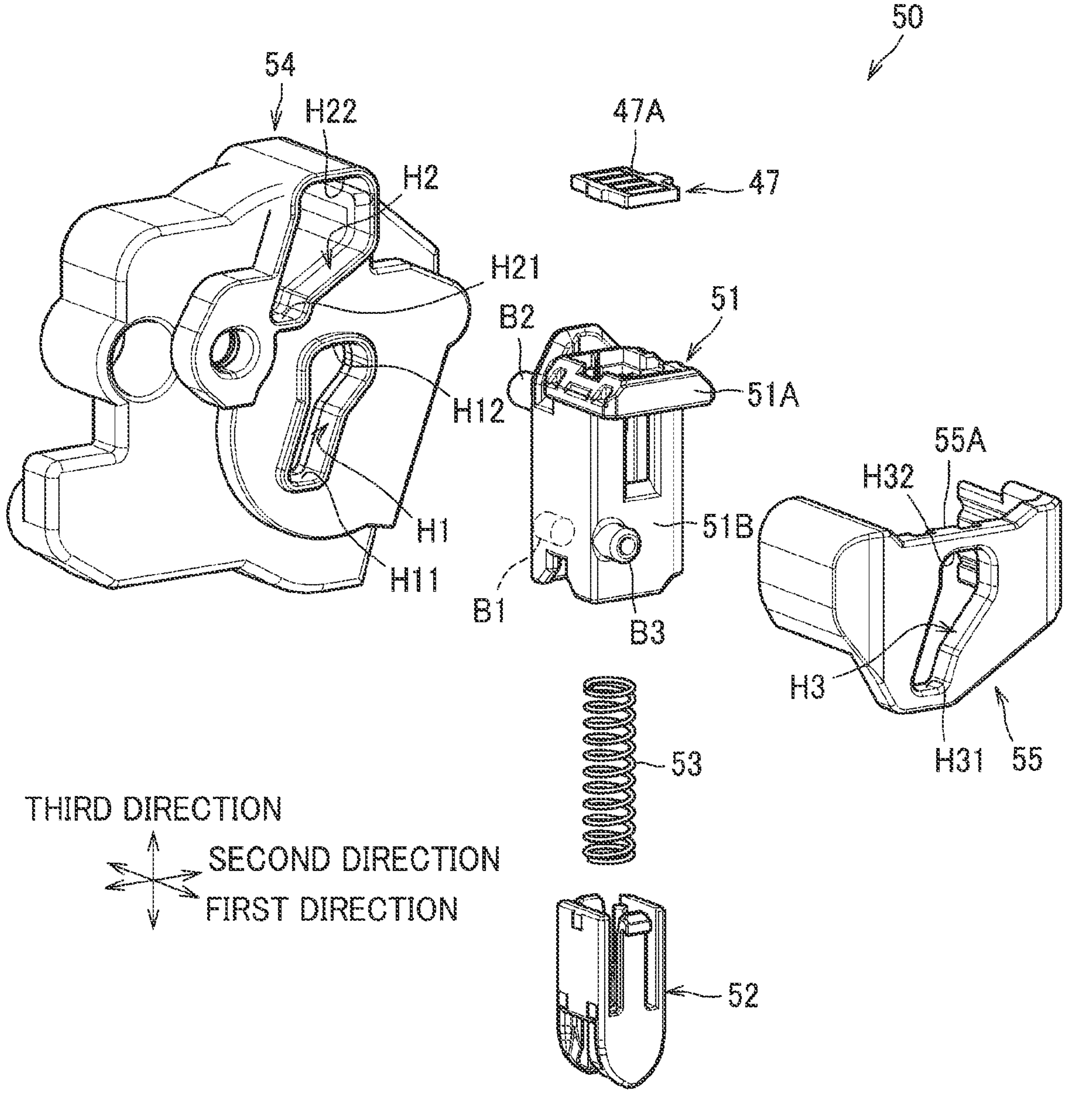
FIG. 9 is an exploded perspective view of a memory holder.

As shown in FIG. 9, the toner cartridge 40 includes a holder unit 50 in which the memory holder 51 is guided movably relative to the toner housing 41. In addition to the memory holder 51, the holder unit 50 includes an advance/retreat member 52, a spring 53 as an example of an elastic member, a first guide 54, and a second guide 55.

The memory holder 51 is a member that holds the toner memory 47. The memory holder 51 holds the advance/retreat member 52 in a manner that renders the advance/retreat member 52 movable in the third direction.

The memory holder 51 includes a mount 51A, a tube 51B, a first boss B1, a second boss B2, and a third boss B3. The mount 51A is a portion that holds the toner memory 47 thereon. The mount 51A protrudes from the tube 51B toward the second guide 55 in the first direction.

The tube 51B has a shape of a rectangular parallelepiped tube. The tube 51B extends from the mount 51A in a direction opposite to a direction in which the toner memory 47 faces. The first boss B1 and the second boss B2 protrude from the tube 51B toward the first guide 54 in a direction extending in the first direction. The second boss B2 is positioned at a predetermined distance apart from the first boss B1 in the third direction. In the present embodiment, the second boss B2 is positioned above the first boss B1. The third boss B3 protrudes from the tube 51B toward the second guide 55 in the first direction.

The spring 53 is located between the memory holder 51 and the advance/retreat member 52. The spring 53 extends in the third direction. The spring 53 is a coil spring. The spring 53 is configured to bias the advance/retreat member 52 in a direction away from the toner memory 47.

The first guide 54 is located at an outer surface of the second cover 46. The first guide 54 has a first slot H1 and a second slot H2. The second slot H2 is positioned at a predetermined distance apart from the first slot H1 in the third direction. In the present embodiment, the second slot H2 is positioned above the first slot H1. The first boss B1 of the memory holder 51 is located in the first slot H1. The second boss B2 of the memory holder 51 is located in the second slot H2.

The second guide 55 is attached to the first guide 54 with the tube 51B of the memory holder 51 being located between the first guide 54 and the second guide 55 arranged in the first direction. The second guide 55 includes a third slot H3. The third boss B3 of the memory holder 51 is located in the third slot H3. The second guide 55 has a retaining surface 55A configured to be capable of retaining the mount 51A of the memory holder 51.

The first slot H1, the second slot H2, and the third slot H3 are slots elongate in the third direction. The first slot H1 includes a first end portion H11, and a second end portion H12 located apart, in the third direction, from the first end portion H11. The second end portion H12 has a dimension greater than a dimension of the first end portion H11 in the second direction. When the drum cartridge 20 is installed in the main body housing 10, the first end portion H11 is located below the second end portion H12. The first end portion H11 restricts the movement of the first boss B1 therein in the second direction. The second end portion H12 allows the movement of the first boss B1 therein in the second direction.

The second slot H2 includes a first end portion H21, and a second end portion H22 located apart, in the third direction, from the first end portion H21. The second end portion H22 has a dimension greater than a dimension of the first end portion H21 in the second direction. When the drum cartridge 20 is installed in the main body housing 10, the first end portion H21 is located below the second end portion H22. The first end portion H21 restricts the movement of the second boss B2 therein in the second direction. The second end portion H22 allows the movement of the second boss B2 therein in the second direction.

The third slot H3 includes a first end portion H31, and a second end portion H32 located apart, in the third direction, from the first end portion H31. The second end portion H32 has a dimension greater than a dimension of the first end portion H31 in the second direction. When the drum cartridge 20 is installed in the main body housing 10, the first end portion H31 is located below the second end portion H32. The first end portion H31 restricts the movement of the third boss B3 therein in the second direction. The second end portion H32 allows the movement of the third boss B3 therein in the second direction.

With the holder unit 50 configured as described above, the memory holder 51 with the toner memory 47 retained thereon is rendered movable in the second direction and the third direction relative to the toner housing 41. More specifically, the electric contact surface 47A of the toner memory 47 is movable between a first position shown in FIG. 3 and a second position shown in FIG. 11 relative to the toner housing 41 in the second direction and the third direction.

The first position is a position at which the electric contact surface 47A is located when the toner cartridge 40 is not attached in the image forming apparatus 1 as shown in FIG. 3. The electric contact surface 47A of the drum cartridge 20 which has not been installed in the main body housing 10 is located at the first position. When the electric contact surface 47A is located at the first position, the memory holder 51 is held by the first guide 54 and the second guide 55.

Figure 10A:
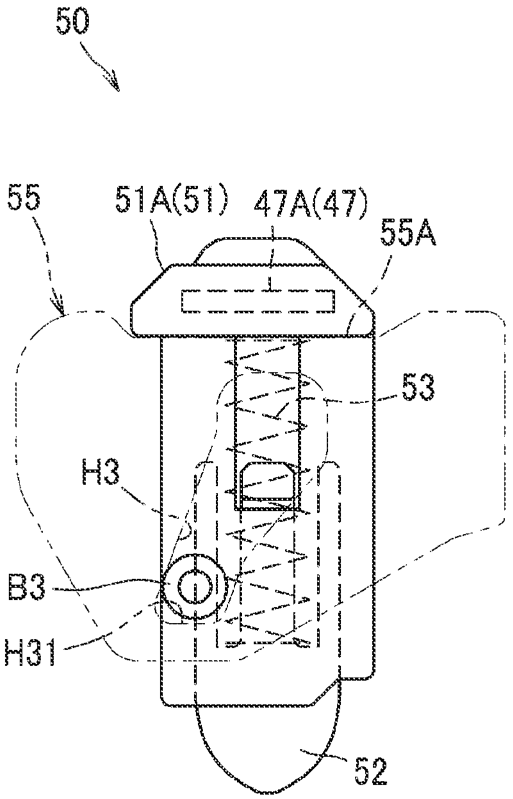
FIG. 10A is a diagram of the memory holder of which an electric contact surface is in a first position, for explaining a motion of the memory holder in a third direction.

To be more specific, as shown in FIG. 10A, when the electric contact surface 47A is at the first position, the mount 51A of the memory holder 51 is in contact with the retaining surface 55A of the second guide 55. When the electric contact surface 47A is at the first position, the third boss B3 is in contact with the first end portion H31 of the third slot H3. Although not illustrated in the drawing, when the electric contact surface 47A is at the first position, the first boss B1 is in contact with the first end portion H11 of the first slot H1. When the electric contact surface 47A is at the first position, the second boss B2 is in contact with the first end portion H21 of the second slot H2.

Figure 11:
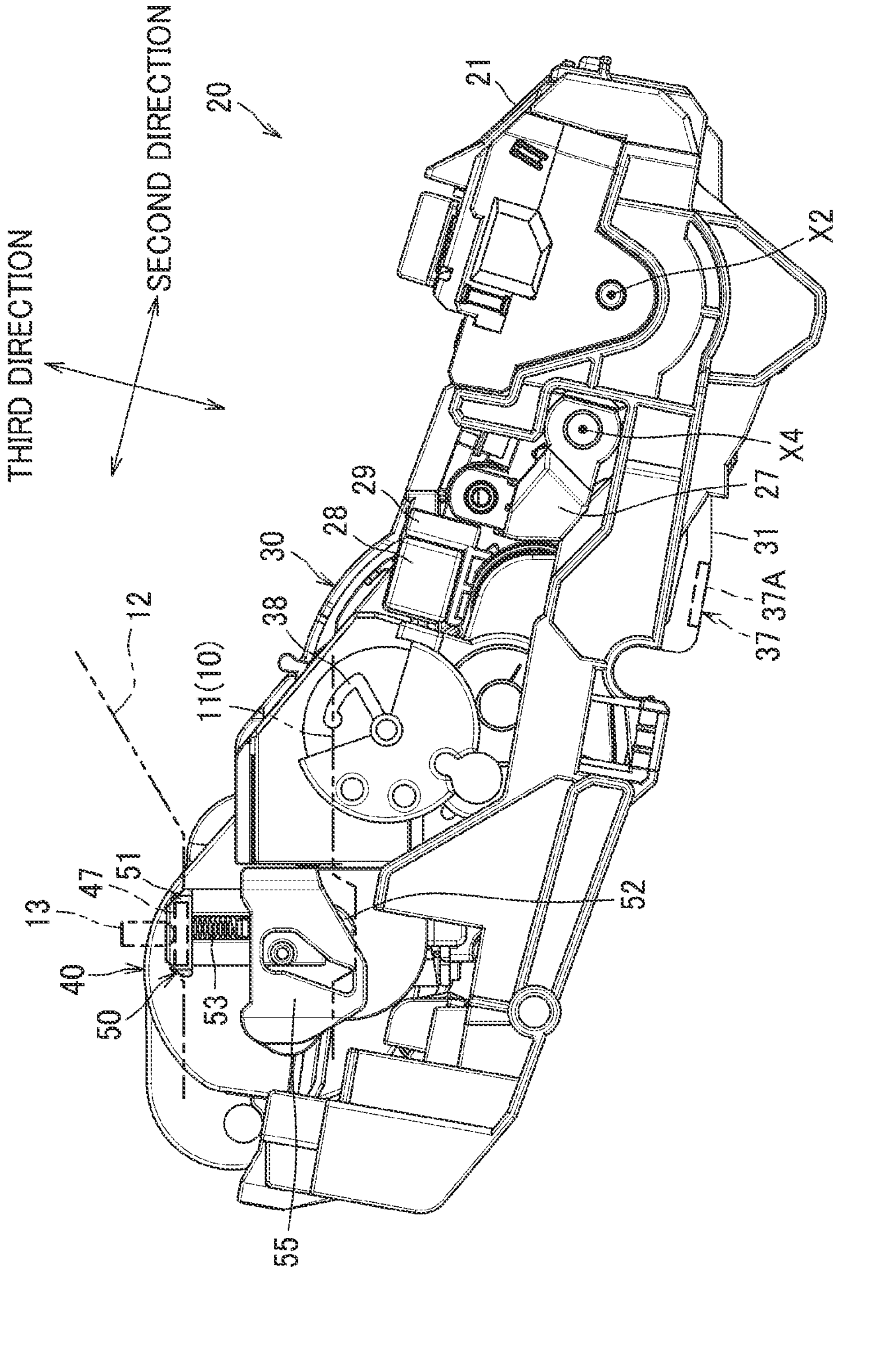
FIG. 11 is a side view of the drum cartridge for explaining a position of the memory holder taken when the drum cartridge is installed in a main body housing.

The second position is a position at which the electric contact surface 47A is located when the toner cartridge 40 attached to the drum cartridge 20 is installed in the image forming apparatus 1 as shown in FIG. 11. The electric contact surface 47A at the second position is farther, than the electric contact surface 47 at the first position, from the fourth axis X4 in the third direction. The electric contact surface 47A at the second position is closer, than the electric contact surface 47A at the first position, to the fourth axis X4 in the second direction. The electric contact surface 47A of the drum cartridge 20 which is attached in the main body housing 10 is located at the second position.

The main body housing 10 includes a lower guide 11, an upper guide 12, and a main body electric contact 13. The lower guide 11 is a guide that is contactable with the lower end of the advance/retreat member 52 to guide the advance/retreat member 52. The upper guide 12 is a guide that is contactable with the upper end of the memory holder 51 to guide the memory holder 51. The main body electric contact 13 is an electric contact that is contactable with the electric contact surface 47A of the toner memory 47. The main body electric contact 13 serves to establish electric connection between the control unit CU and the toner memory 47.

Figure 10B:
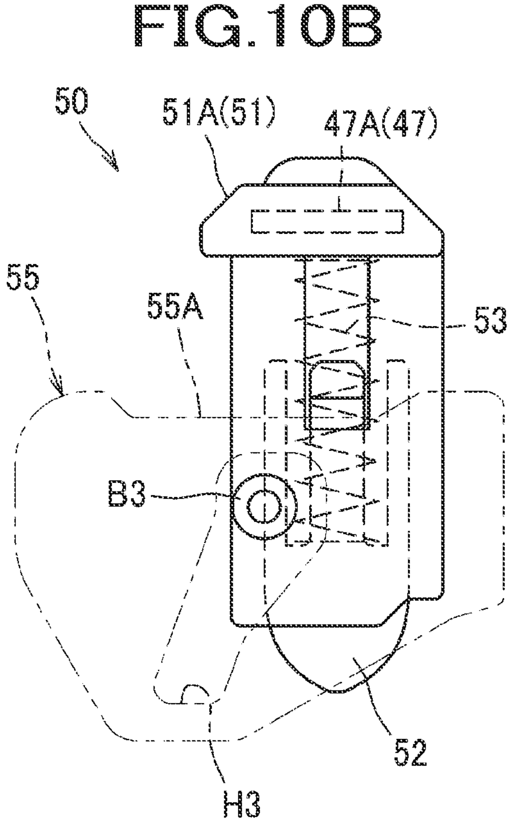
FIG. 10B is a diagram of the memory holder of which the electric contact surface is in a second position, for explaining the motion of the memory holder in the third direction.
Figure 10C:
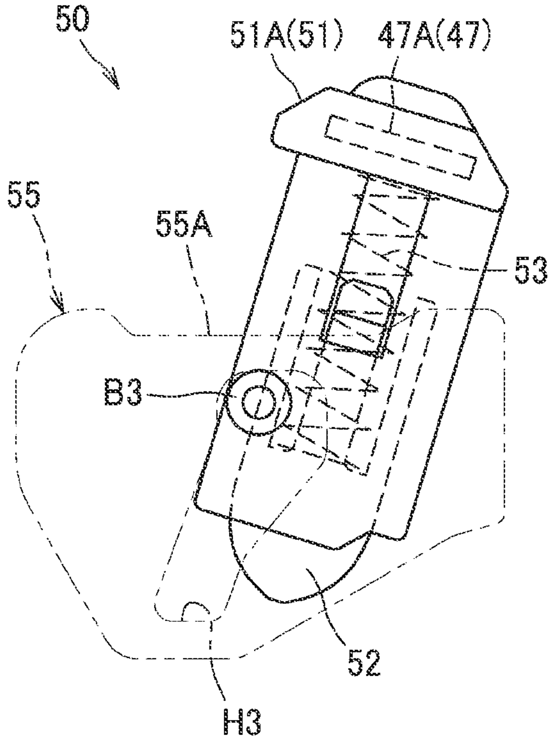
FIG. 10C is a diagram of the memory holder for explaining a motion of the memory holder in a second direction.
Figure 10D:
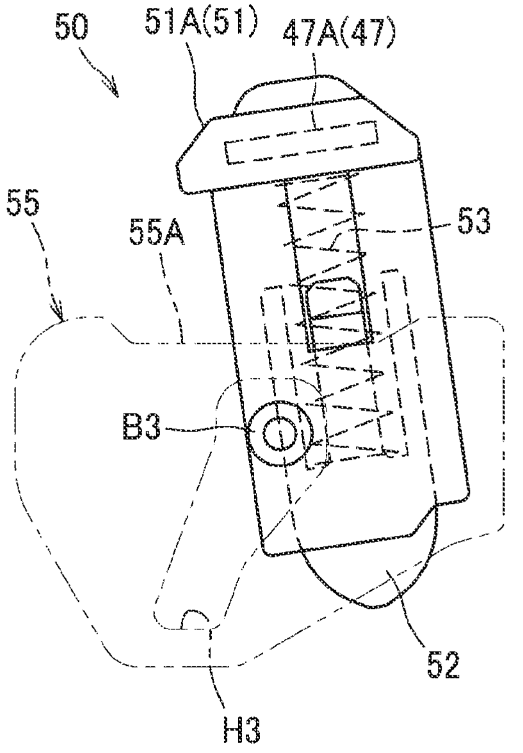
FIG. 10D is a diagram of the memory holder for explaining the motion of the memory holder in the second direction.

The memory holder 51 with the toner memory 47 having the electric contact surface 47A located in the second position is retained via the advance/retreat member 52 and the spring 53 by the upper guide 12 of the main body housing 10. As shown in FIG. 10B, the mount 51A of the memory holder 51 with the toner memory 47 having the electric contact surface 47A located at the second position is positioned above and spaced apart from the retaining surface 55A of the second guide 55. The third boss B3 of the memory holder 51 with the toner memory 47 having the electric contact surface 47A located at the second position is spaced apart from the inside surface of the third slot H3. Although not illustrated in the drawing, the first boss B1 of the memory holder 51 with the toner memory 47 having the electric contact surface 47A located at the second position is spaced apart from the inside surface of the first slot H1. Further, the second boss B2 of the memory holder 51 with the toner memory 47 having the electric contact surface 47A located at the second position is spaced apart from the inside surface of the second slot H2. The toner memory 47 having the electric contact surface 47A located at the second position is biased to and pressed against the main body electric contact 13 by the biasing force of the spring 53. The electric contact surface 47A at the second position is in contact with the main body electric contact 13.

In the process of attaching the toner cartridge 40 into the image forming apparatus 1, the electric contact surface 47A of the toner memory 47 in the toner cartridge 40 moves from the first position to the second position. Before the electric contact surface 47A reaches the second position and comes in contact with the main body electric contact 13, the memory holder 51 with its first boss B1 being positioned in the second end portion H12 of the first slot H1 and its second boss B2 being positioned in the second end portion H22 of the second slot H2 is movable in the second direction.

In the present embodiment as described above, the following advantageous effects can be achieved.

In the process of attaching the toner cartridge 40 to the second frame 31 of the development device 30, the cover opening 44K can be opened in conjunction with the operation of moving the toner housing 41 relative to the development device 30 from the close position to the open position. Conversely, in the process of detaching the toner cartridge 40 from the second frame 31 of the development device 30, the cover opening 44K can be closed in conjunction with the operation of moving the toner housing 41 relative to the development device 30 from the open position to the close position. In these operations, as the toner cartridge 40 in this embodiment is configured to have the memory holder 51 located at a position different (shifted) from the position of the shutter 45 in the first direction, the toner memory 47 is out of the way of the toner housing 41 being rotated in the process of attachment of the toner cartridge 40.

Since the memory holder 51 holding the toner memory 47 is movable relative to the toner housing 41 in the third direction, the electric contact surface 47A of the toner memory 47 can be restrained from rubbing against the main body electric contact 13 in the process of attachment of the toner cartridge 40 into the image forming apparatus 1. Since the memory holder 51 is located at a position different (shifted) from the position of the shutter 45 in the first direction, undesirable upsizing of the toner cartridge 40 in the second direction can be restrained.

The memory holder 51 and the toner housing 41 are aligned in the first direction. Therefore, undesired upsizing of the toner cartridge 40 in the second direction can be restrained.

In the drum cartridge 20 as described above, the drum memory 37 is located at a position farther, than the toner memory 47, from the lock lever L in the second direction. Therefore, the distance from the drum memory 37 to the lock lever L in the second direction can be made sufficiently long, particularly, longer than the distance from the toner memory 47 to the lock lever L in the second direction.

Figure 12:
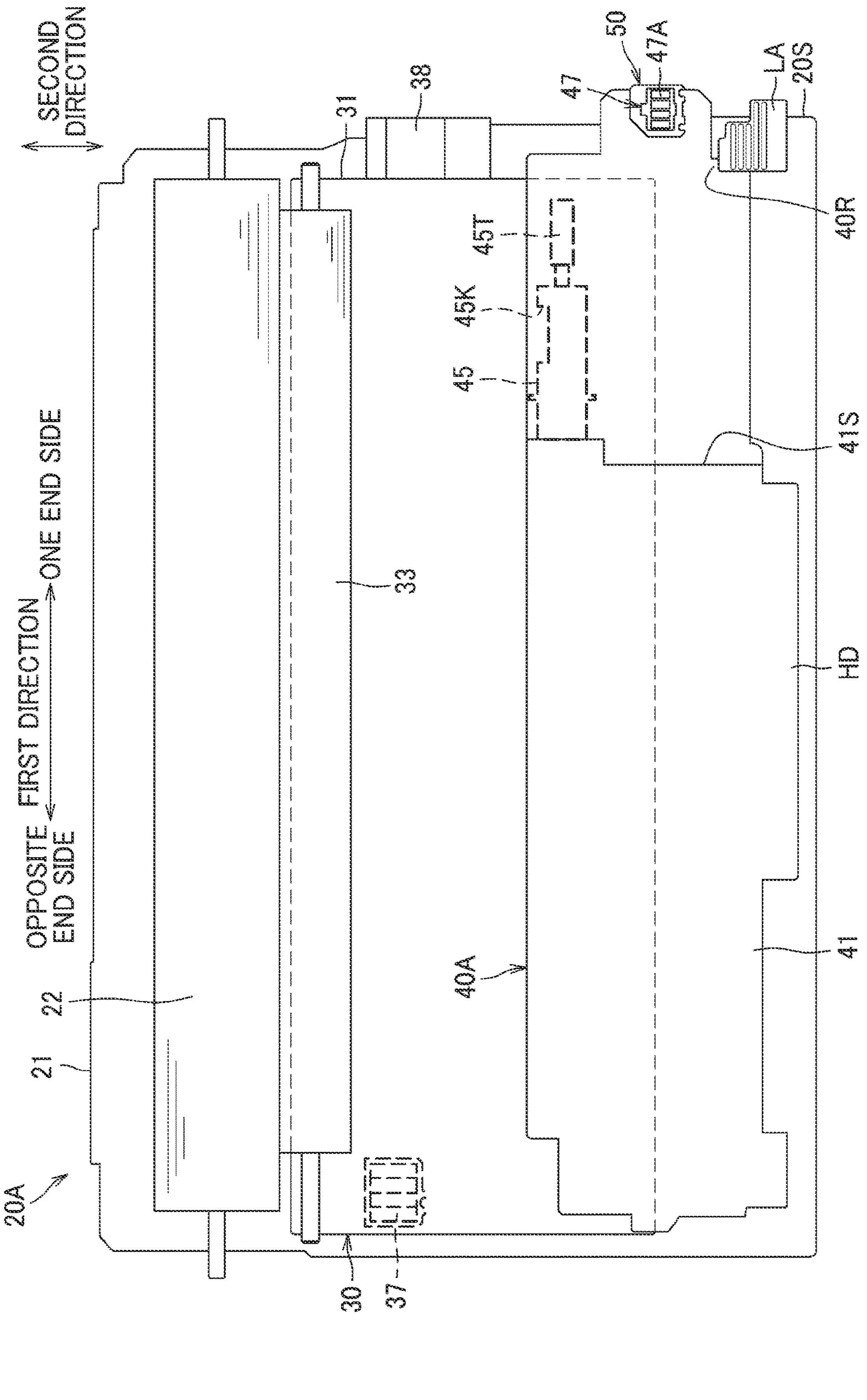
FIG. 12 is a plan view of a drum cartridge of a modified example as viewed from above.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, the drum cartridge 20 as illustrated in FIG. 4 is configured to have the lock lever L located at the opposite end portion of the drum cartridge 20; however, the lock lever L may not necessarily be located at the opposite end portion. For example, as shown in FIG. 12, a lock lever LA may be located at one end portion of a drum cartridge 20A so that an engageable portion 40R of a toner cartridge 40A can be locked by the lock lever LA to cause the toner cartridge 40A to be locked in position at the development device 30.

In the above-described embodiment, the toner conveyor unit 43 is configured as an auger including a shaft and spirally twisted blade; however, the toner conveyor unit 43 may be a member including a shaft and a vane extending from the shaft.

In the above-described embodiment, each memory for storing information is described as a storage medium having an electric contact surface, that is, the electric contact surface is provided integrally with a storage element of the memory; however, the electric contact surface and the storage element may be provided separately. In this alternative configuration, the electric contact surface may be electrically connected to the storage element via a harness.

In the above-described embodiment, the image forming apparatus in which the drum cartridge or the toner cartridge is used is configured as a monochrome printer; however, any other type of image forming apparatus may be adopted, such as a color printer, a copier, a multifunction peripheral.

The elements described in the above embodiments and modified examples may be implemented selectively and in combination.

What is claimed is:

1. A toner cartridge comprising:

a toner housing extending in a first direction, the toner housing having a first interior space to store toner therein, the toner housing including one end portion in the first direction, the toner housing having a toner housing opening at the one end portion, and the toner housing opening allowing the toner in the first interior space to be let out from the toner housing;

a toner conveyor unit extending in the first direction, the toner conveyor unit being rotatable about a first axis extending in the first direction, the toner conveyor unit being configured to convey toner from the first interior space to the toner housing opening;

a first cover located at the one end portion of the toner housing, the first cover covering the toner housing opening, the first cover being movable together with the toner housing, the first cover having a cover opening allowing the toner in the first interior space to be let out from the toner housing;

a shutter located at the one end portion of the toner housing, the shutter having a shutter opening, the shutter including a protrusion protruding in the first direction, the protrusion being positioned farther, than the first cover, from the one end portion of the toner housing in the first direction;

a toner memory having an electric contact surface extending in a second direction crossing the first direction, the electric contact surface crossing a third direction, the third direction crossing the first direction and the second direction; and a memory holder having an outer surface to hold the toner memory, the memory holder being movable relative to the toner housing, and the memory holder being movable in the third direction, wherein when the toner cartridge is attached to a development device, the protrusion is located in place relative to the development device, and the toner housing is movable together with the first cover relative to the development device between a close position and an open position, wherein when the toner housing is in the close position, the cover opening is closed with the shutter, wherein when the toner housing is in the open position, at least part of the shutter opening is aligned with at least part of the cover opening to allow the toner to be let out through the cover opening, and wherein a position of the memory holder is different from a position of the shutter in the first direction.

2. The toner cartridge according to claim 1, wherein the protrusion is located at a position between the cover opening and the memory holder in the first direction.

3. The toner cartridge according to claim 1, wherein the memory holder and the toner housing are aligned in the first direction.

4. The toner cartridge according to claim 1, wherein the electric contact surface is located at a position different from a position of the toner housing in the first direction.

5. The toner cartridge according to claim 1, wherein the electric contact surface faces in a direction perpendicular to the first direction.

6. The toner cartridge according to claim 1, wherein the toner cartridge includes a first guide that guides the memory holder in a manner that permits the memory holder to move relative to the toner housing, wherein the first guide has a first slot elongate in the third direction, and a second slot elongate in the third direction, the second slot being positioned at a predetermined distance apart from the first slot in the third direction, and wherein the memory holder includes a first boss protruding from the memory holder in the first direction and located in the first slot, and a second boss protruding from the memory holder in the first direction and located in the second slot, the second boss being positioned at a predetermined distance apart from the first boss in the third direction.

7. The toner cartridge according to claim 6, wherein the first slot includes a first end portion, and a second end portion located apart, in the third direction, from the first end portion, the second end portion of the first slot having a dimension greater than a dimension of the first end portion of the first slot in the second direction, wherein the second slot includes a first end portion, and a second end portion located apart, in the third direction, from the first end portion, the second end portion of the second slot having a dimension greater than a dimension of the first end portion of the second slot in the second direction, and wherein, in a case where the first boss is positioned at the second end portion of the first slot and the second boss is positioned at the second end portion of the second slot, the memory holder is movable in the second direction.

8. The toner cartridge according to claim 1, further comprising an engageable portion that is locked by a lock lever of the development device, in a case where the toner cartridge is attached to the development device, wherein the engageable portion is located at another end portion of the toner housing being positioned at an opposite side of the one end portion.

9. A drum cartridge comprising:

a photoconductor drum;

a first frame supporting the photoconductor drum;

a development device including a development roller; and a toner cartridge according to claim 1.

10. The drum cartridge according to claim 9, wherein the toner housing has a first side surface facing in the first direction, the first side surface being located at the one end portion of the toner housing, wherein the first frame includes a first side wall facing to the first side surface of the toner housing, and wherein the first side wall is located between at least part of the memory holder and the toner housing in the first direction.

11. The drum cartridge according to claim 9, further comprising a detection gear for detecting whether or not the drum cartridge is brand-new, wherein at least part of the memory holder is located within an area corresponding to an extent of the detection gear in the first direction.

* * * * *